United States Patent
Shiozaki et al.

(10) Patent No.: US 7,236,659 B2
(45) Date of Patent: Jun. 26, 2007

(54) OPTICAL DEVICE AND MOVABLE REFLECTOR

(75) Inventors: Manabu Shiozaki, Yokohama (JP); Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/069,925

(22) Filed: Mar. 2, 2005

(65) Prior Publication Data

US 2005/0220395 A1    Oct. 6, 2005

Related U.S. Application Data

(60) Provisional application No. 60/549,139, filed on Mar. 3, 2004.

(30) Foreign Application Priority Data

Mar. 2, 2004   (JP) ............... P2004-057843

(51) Int. Cl.
*G02B 6/26* (2006.01)

(52) U.S. Cl. ........................................ 385/18

(58) Field of Classification Search ............ 385/16–25, 385/39, 140
See application file for complete search history.

(56) References Cited

U.S. PATENT DOCUMENTS 6,222,656 B1 *  4/2001  Eu ........................ 398/9

| | | | |
|---|---|---|---|
| 6,246,826 B1 * | 6/2001 | O'Keefe et al. | 385/140 |
| 2002/0135864 A1 | 9/2002 | Chiu et al. | |
| 2002/0181928 A1 | 12/2002 | Chen et al. | |
| 2003/0053743 A1 | 3/2003 | Liu et al. | |
| 2003/0099454 A1 | 5/2003 | Chang | |

FOREIGN PATENT DOCUMENTS

EP    1 211 544    6/2002

OTHER PUBLICATIONS

C. Marxer, et al.; "Micro-Opto-Mechanical 2×2 Switch for Single Mode Fibers Based on Plasma-Etched Silicon Mirror and Electrostatic Actuation"; Eleventh IEEE Workshop on Micro-Electro-Mechanical System; c. 1998; pp. 233-237.
Search Report dated Jun. 16, 2006.

\* cited by examiner

*Primary Examiner*—Sarah Song
(74) *Attorney, Agent, or Firm*—McDermott Will & Emery LLP

(57) ABSTRACT

An optical device comprising a first optical path having a first optical axis, a second optical path having a second optical axis not parallel to the first optical axis, and a mirror arranged to move across a bisector of an angle between the first and second optical axes. The mirror has a surface including a reflecting portion for reflecting light from the first path toward the second path. The reflecting portion has an edge including a linear portion placed on a plane substantially perpendicular to the bisector. The linear portion is inclined relative to a normal to a plane including the first and second optical axes.

13 Claims, 13 Drawing Sheets

(a)

(b)

OPTICAL DEVICE AND MOVABLE REFLECTOR

RELATED APPLICATIONS

This application claims the benefit of U.S. Provisional Application No. 60/549,139, filed Mar. 3, 2004.

BACKGROUND OF THE INVENTION

1. Field of the Invention

The present invention relates to an optical device for regulating the power of light propagating from a first optical path to a second optical path, and a movable reflector used in the optical device.

2. Related Background Art

Optical communication is often implemented using optical devices for regulating the power of optical signals, e.g., variable optical attenuators and optical switches. An example of such optical devices is disclosed in C. Marxer et al., "Micro-Opto-Mechanical 2×2 Switch for Single Mode Fibers based on Plasma-Etched Silicon Mirror and Electrostatic Actuation" (preceding 11th IEEE Workshop on Micro-Electro-Mechanical System, 1998, pp 233-237). In this optical device, a mirror is disposed on an optical path between two optical waveguides and the mirror is moved to change the quantity of the reflected light, thereby regulating the power of light propagating from one optical waveguide to another optical waveguide.

SUMMARY OF THE INVENTION

FIG. 1 is a schematic plan view showing an example of a variable optical attenuator using a mirror. The variable optical attenuator 50 has a Planar Lightwave Circuit (PLC) 10, a mirror 20, and a mirror driver device 30. Optical waveguides 11 and 12 in the PLC 10 have their respective ends placed in mirror symmetry with respect to a plane 13. These ends have their respective end faces 11a and 12a aligned on a single plane. The mirror 20 has a reflecting surface 20a parallel to these end faces 11a and 12a. The mirror driver device 30 is able to move the mirror 20 along directions indicated by arrows 32 and 33. When light from the optical waveguide 11 is incident onto the reflecting surface 20a, it is reflected toward the optical waveguide 12. This causes the light to propagate from the optical waveguide 11 to the optical waveguide 12. On the other hand, when the light from the optical waveguide 11 is not incident onto the reflecting surface 20a, the light does not enter the optical waveguide 12.

As shown in FIG. 1, the reflecting surface 20a has an edge 20b that moves across the plane 13 with movement of the mirror 20. At the edge 20b incident light is scattered into various directions by virtue of diffraction. For this reason, part of the light from the optical waveguide 11 is fed back to the optical waveguide 11 to propagate again in the optical waveguide 11. This light is optical feedback to the optical waveguide 11. This optical feedback can distort the waveform of the signal light propagating in the optical waveguide 11 and cause a communication error.

It is, therefore, an object of the present invention to reduce the optical feedback to a first optical path in an optical device for regulating the power of light propagating from the first optical path to a second optical path.

FIG. 2 shows the relationship between the position of the mirror edge 20b and coupling efficiency in the variable optical attenuator 50 shown in FIG. 1. At the mirror edge position of 0 μm, the edge 20b is located on the plane 13 between the optical waveguides 11 and 12. In FIG. 2 a solid line represents the coupling efficiency of light traveling from the optical waveguide 11 to the optical waveguide 12, a chain line the coupling efficiency of light fed from the optical waveguide 11 back to the optical waveguide 11, and a chain double-dashed line the coupling efficiency of light fed from the optical waveguide 12 back to the optical waveguide 12. It is noted that in FIG. 2 the chain line and the chain double-dashed line overlap each other. As shown in FIG. 2, the variable optical attenuator 50 demonstrates the large coupling efficiency of optical feedback to the optical waveguides 11 and 12. Therefore, the waveform of signal light in the optical waveguides is relatively likely to be distorted.

A conceivable method of preventing the distortion of the waveform of signal light is to connect isolators 51 and 52 to the respective optical waveguides 11 and 12, as shown in FIG. 3. Signal light 55 propagating in the optical waveguide 11 is reflected by the mirror 20 and is then incident into the optical waveguide 12 to propagate in the optical waveguide 12. Optical feedback 56 to the optical waveguide 11, caused by scattering at the edge part 20b of the mirror 20, is cut off by the isolator 51 connected to the optical waveguide 11. The isolator 52 connected to the optical waveguide 12 cuts off optical feedback 57 from an external device connected to the variable optical attenuator 50 to prevent incidence thereof into the variable optical attenuator 50. Therefore, it is also feasible to prevent occurrence of optical feedback from the optical waveguide 12 to the optical waveguide 12. A typical tolerance of coupling efficiency of optical feedback is −45 dB, and tolerances differ according to systems using the variable optical attenuator.

The use of isolators as described above makes it feasible to prevent the influence of optical feedback on the signal light in the optical communication system using the variable optical attenuator. However, the need for connection of the isolators to the optical waveguides leads to making construction of the system more complex and increasing the production cost of the system. Hence, the Inventors invented another optical device and mirror capable of reducing the optical feedback.

In one aspect, the present invention relates to an optical device comprising a first optical path having a first optical axis; a second optical path having a second optical axis not parallel to the first optical axis; and a mirror adapted to move across a bisector of an angle between the first optical axis and the second optical axis. The mirror has a surface including a reflecting portion for, when receiving light from the first optical path, reflecting the light toward the second optical path.

The reflecting portion may have an edge including a linear portion placed on a plane substantially perpendicular to the bisector. The linear portion may be inclined relative to a normal to a plane including the first and second optical axes. An acute angle between the linear portion and the normal is preferably not less than 5°. In another configuration, the reflecting portion may have an edge including a curved portion placed on a plane substantially perpendicular to the bisector.

In still another configuration, the reflecting portion may have an edge including a portion placed on a plane substantially perpendicular to the bisector, and in this portion, the value of function Rav(X) defined by the following equation varies at least from 10% to 90% between two different X coordinates:

$$Rav(X) = \int R(X,Y) \cdot \Phi(Y) dY / \int \Phi(Y) dY,$$

where X represents a coordinate in an X-axis direction extending along an intersecting line between the plane including the first and second optical axes, and the reflecting portion, Y a coordinate in a Y-axis direction extending perpendicularly to the X-axis on the reflecting portion, R(X,Y) a reflectance distribution on the XY plane, and Φ(Y) a Y-directional intensity distribution of light incident from the first optical path to the reflecting portion.

The distance between the two X coordinates where the value of function Rav(X) varies from 10% to 90% is preferably not less than 3% of a mode field diameter in the X-direction of the light incident from the first optical path to the reflecting portion.

The optical device in accordance with the present invention may further comprise at least either an optical waveguide optically coupled to the first optical path or an optical waveguide optically coupled to the second optical path. The optical waveguides may be planar waveguides or optical fibers.

In another aspect, the present invention relates to a movable reflector comprising a reflecting surface, and a driver device capable of moving the reflecting surface along a predetermined moving path. The moving path extends in parallel with a plane substantially perpendicularly traversing the reflecting surface. The reflecting surface has an edge adapted to move while intersecting the plane as the reflecting surface moves along the moving path. The edge may include a linear portion inclined relative to a normal to the plane. An acute angle between the linear portion and the normal is preferably not less than 5°. In another configuration, the edge may include a curved portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
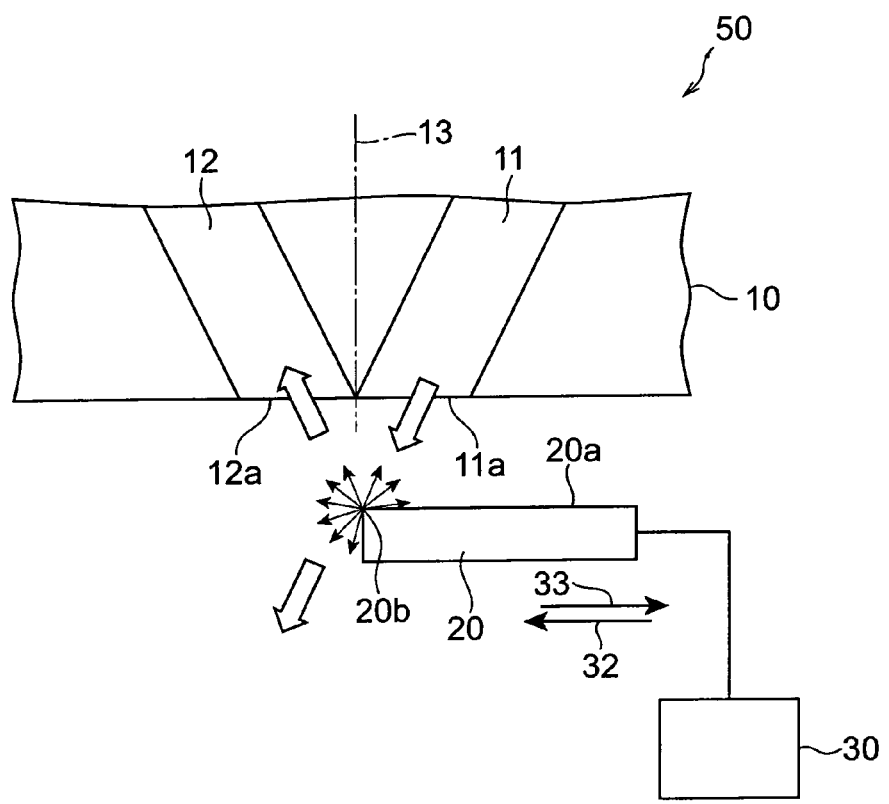
FIG. 1 is a schematic plan view showing an example of a variable optical attenuator.
Figure 2:
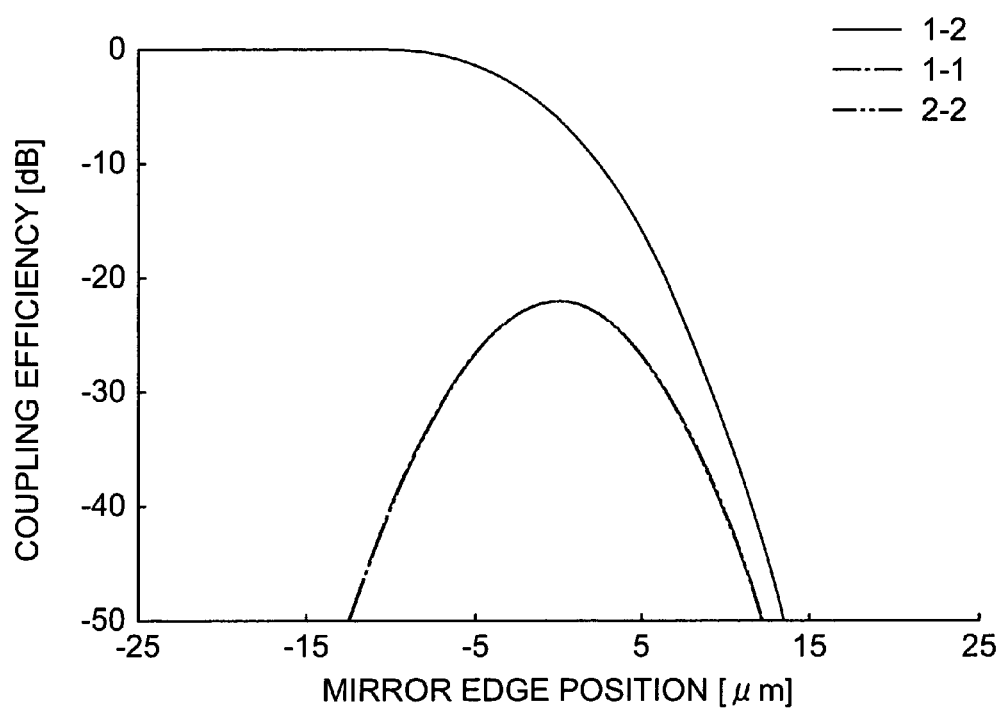
FIG. 2 is a graph showing the relationship between position of an edge of a mirror shown in FIG. 1, and coupling efficiency.
Figure 3:
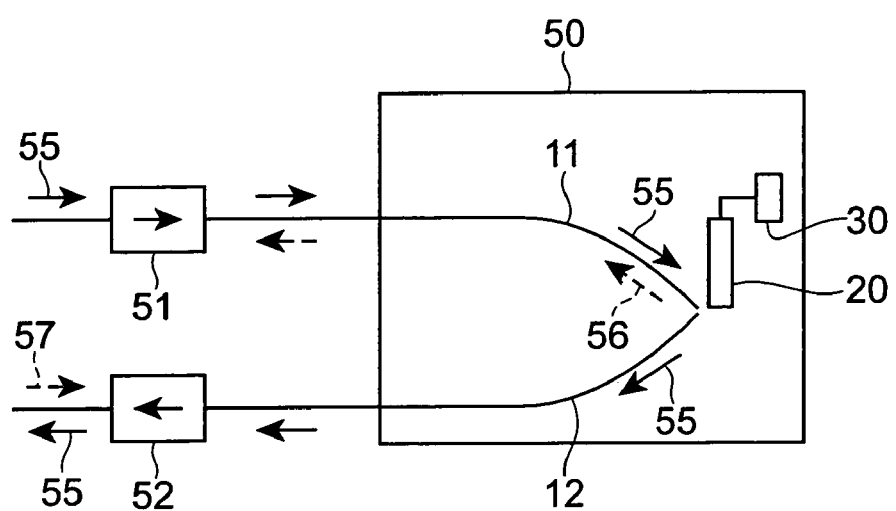
FIG. 3 is a schematic diagram showing one method of reducing optical feedback.

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

First Embodiment

Figure 4:
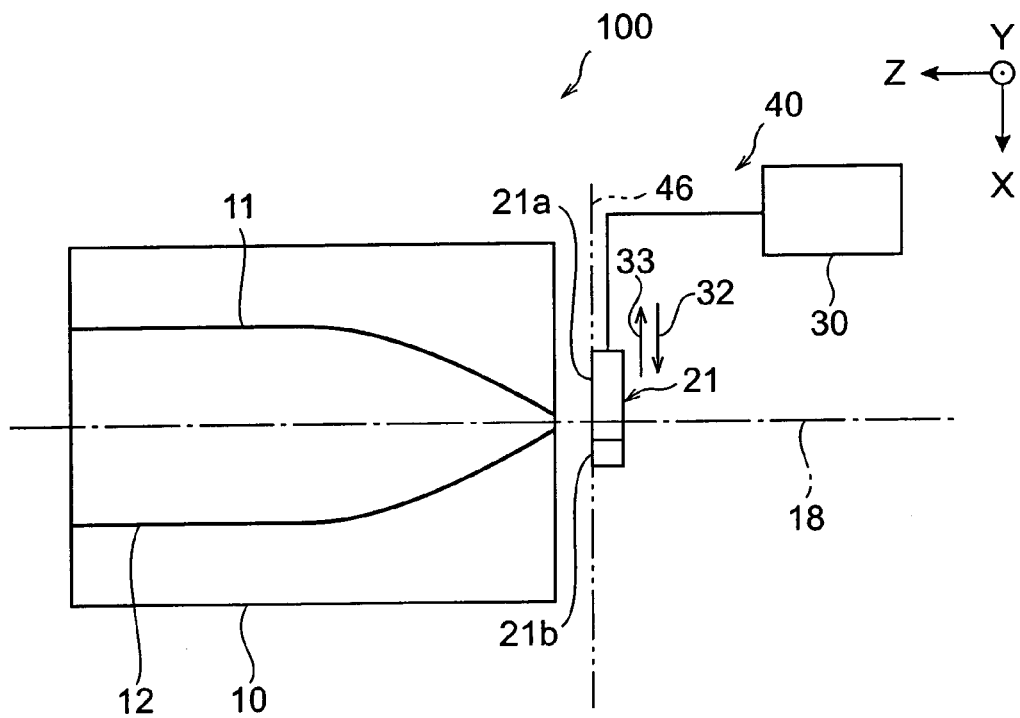
FIG. 4 is a schematic plan view showing a variable optical attenuator of a first embodiment.

FIG. 4 is a schematic plan view showing an optical device of the first embodiment. This optical device is a variable optical attenuator 100. The variable optical attenuator 100 has a Planar Lightwave Circuit (PLC) 10, a mirror 21, and a mirror driver device 30. The mirror 21 and the mirror driver device 30 constitute a movable reflector 40.

The PLC 10 has two optical waveguides 11 and 12. The optical waveguides 11 and 12 are planar waveguides extending in parallel to the plane of FIG. 4. The optical waveguides 11 and 12 are made, for example, of silica glass. The ends of the optical waveguides 11 and 12 on the side near the mirror 21 may intersect and overlap with each other, or may be separated from each other.

The mirror 21 is an optical reflector having a reflecting surface 21a. The reflecting surface 21a is substantially flat and has an extremely high reflectance (e.g., 90% or more) for light of a predetermined wavelength propagating in the optical waveguides 11 and 12. The reflecting surface 21a has a substantially uniform reflectance. The reflecting surface 21a is provided on a surface of the mirror 21 and extends in the direction perpendicular to the plane of FIG. 4. The mirror 21 moves so that the reflecting surface 21a faces the end faces of the optical waveguides 11 and 12. The clearance between the reflecting surface 21a and these end faces may be filled with a refractive-index matching material. The details of the mirror 21 will be described later.

The mirror driver device 30 moves the mirror 21 substantially in parallel with the ZX plane, as indicated by arrows 32 and 33. In response thereto, the reflecting surface 21a of the mirror 21 moves along a moving path 46. The movement of the mirror 21 is reversible. The moving path 46 extends in parallel with a plane (e.g., the plane of FIG. 4) substantially perpendicularly traversing the reflecting surface 21a. In the present embodiment the moving path 46 is of a linear shape extending substantially in the X-direction. In the region near the end faces of the optical waveguides 11 and 12, therefore, the reflecting surface 21a moves substantially in parallel with the end faces of the optical waveguides 11 and 12, as indicated by arrows 32 and 33. An example of the mirror driver device 30 is an electrostatic actuator as described in C. Marxer et al. mentioned above.

The moving path 46 may also be of a curved shape. If the radius of curvature of the moving path 46 is sufficiently large, the reflecting surface 21a can be moved substantially in the X-direction in the region near the end faces of the optical waveguides 11 and 12.

An XYZ orthogonal coordinate system is depicted in FIG. 4 for convenience' sake of description. The X-axis extends along an intersecting line between the reflecting surface 21a and the plane including both the optical axes of the waveguides 11 and 12. The Y-axis extends perpendicularly to the X-axis in the plane perpendicular to a bisector of an angle between the two optical axes of the waveguides 11 and 12. The Z-axis extends in parallel with the bisector.

Figure 5:
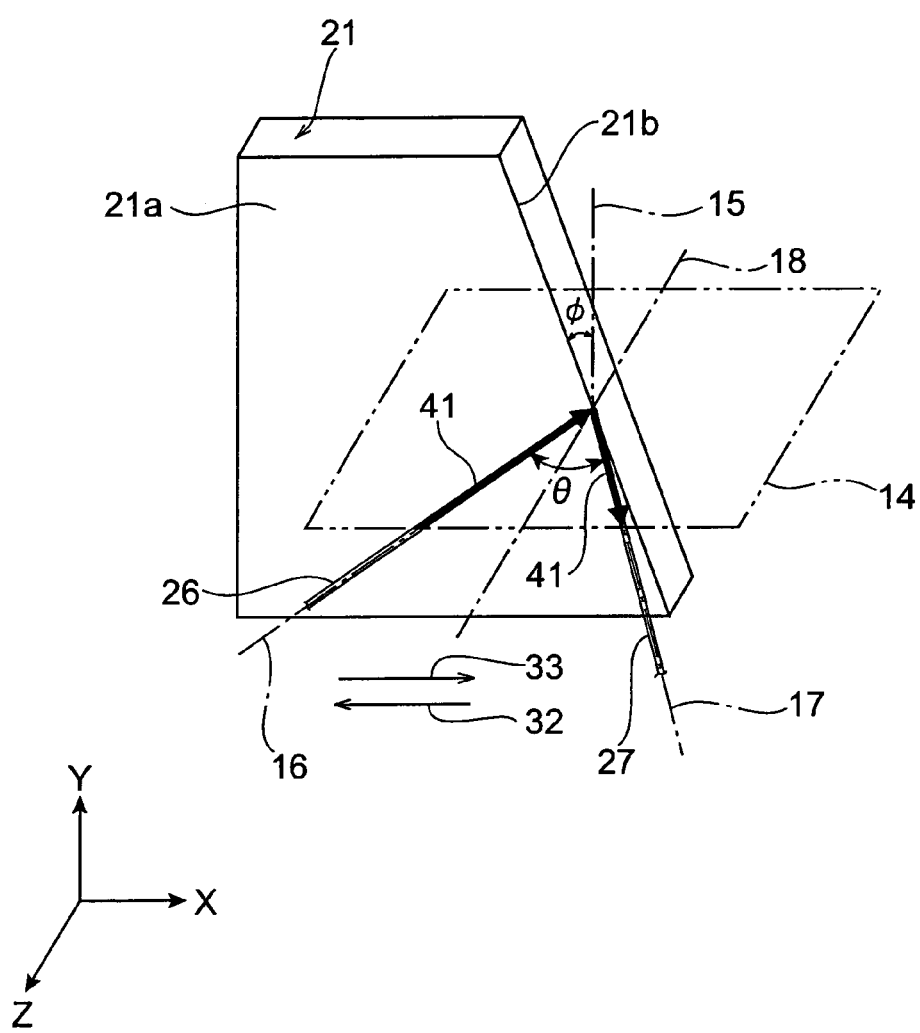
FIG. 5 is a schematic perspective view showing a mirror in the first embodiment.
Figure 6:
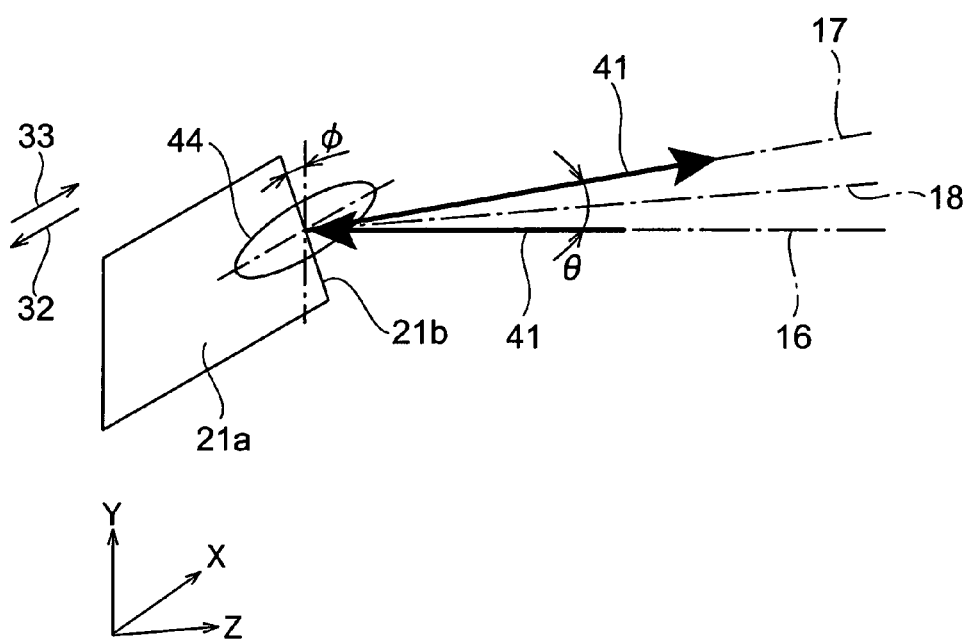
FIG. 6 is a view showing a reflecting surface of the mirror from an angle different from that in FIG. 5.

The mirror 21 will be described below in further detail with reference to FIGS. 5 and 6. FIG. 5 is a schematic perspective view showing the mirror 21. FIG. 6 is a view showing the reflecting surface 21a of the mirror 21 from an angle different from that in FIG. 5.

As shown in FIG. 5, the variable optical attenuator 100 has optical paths 26 and 27 for feeding light from the optical waveguide 11 via the mirror 21 to the optical waveguide 12. The optical paths 26 and 27 are optically coupled to the optical waveguides 11 and 12, respectively. The reflecting surface 21a of the mirror 21 moves so as to intersect the optical path 26. The optical paths 26 and 27 extend between the reflecting surface 21a and the end faces of the optical waveguides 11 and 12. Light 41 emerging from the optical waveguide 11 travels on the optical path 26 toward the mirror 21, and is reflected on the reflecting surface 21a to travel on the optical path 27 toward the optical waveguide 12. The optical paths 26 and 27 have their respective optical axes 16 and 17. The optical axes 16 and 17 are placed on a plane parallel to the plane of FIG. 4. The optical axes 16 and 17 are not parallel to each other, and intersect at an angle θ. A bisector 18 of the angle θ extends on the plane including the optical axes 16 and 17. Numeral 14 in FIG. 5 represents the plane including the optical axes 16 and 17. The plane 14 will be referred to hereinafter as a reference plane. The reference plane 14 is substantially parallel to the moving path 46 of the reflecting surface 21a and substantially perpendicularly traverses the reflecting surface 21a.

As shown in FIG. 5, the reflecting surface 21a of the mirror 21 is trapezoidal. The reflecting surface 21a has a linear edge 21b arranged to move so as to pass across the bisector 18 with movement of the mirror 21. The edge 21b moves while intersecting the reference plane 14 as the reflecting surface 21a moves along the moving path 46. The reflecting surface 21a and the edge 21b are located substantially on the XY plane. The bisector 18 is parallel to the Z-axis, as described above. Therefore, the edge 21b is located on a plane substantially perpendicular to the bisector 18. The edge 21b is inclined relative to a normal 15 to the reference plane 14 and makes an acute angle φ with the normal 15.

In order to efficiently couple light between the optical waveguides 11 and 12 via the reflecting surface 21a, the reflecting surface 21a and the edge 21b are preferably perfectly perpendicular to the bisector 18. In practice, however, a satisfactorily high coupling efficiency can be achieved if an angle between a projected line of the bisector 18 onto the reflecting surface 21a and the bisector 18 is within the range of 85° to 90°, and more preferably within the range of 89° to 90°.

When receiving from the optical waveguide 11 the light 41 traveling along the optical axis 16 of the optical path 26, the reflecting surface 21a reflects the light 41 along the optical axis 17 of the optical path 27. In consequence, the light 41 from the optical waveguide 11 is incident along the optical axis 17 into the optical waveguide 12 and then propagates in the optical waveguide 12. On the other hand, if the light from the optical waveguide 11 does not impinge on the reflecting surface 21a, the light is not incident to the optical waveguide 12.

FIG. 6 shows an enlarged view of a cross section of beam 44 of incident light 41. When the light incident from the optical waveguide 11 to the reflecting surface 21a is distributed on the edge 21b, as shown in FIG. 6, the incident light is scattered at the edge 21b by virtue of diffraction. Part of the scattered light is coupled to the optical waveguide 12 and propagates in the optical waveguide 12. After the mirror 21 is moved in the direction of arrow 32 from the position shown in FIG. 6, the incident light comes to be reflected by a narrower region on the reflecting surface 21a, so as to decrease the coupling efficiency from the optical waveguide 11 to the optical waveguide 12. Conversely, after the mirror 21 is moved in the direction of arrow 33 from the position shown in FIG. 6, the incident light comes to be reflected by a wider region on the reflecting surface 21a, so as to increase the coupling efficiency from the optical waveguide 11 to the optical waveguide 12. Therefore, the power of light propagating from the optical waveguide 11 to the optical waveguide 12 can be varied according to the movement of the mirror 21. This is the principle of the operation of the variable optical attenuator 100.

Part of the light scattered at the edge 21b returns to the optical waveguide 11. This is optical feedback to the optical waveguide 11. In the present embodiment the optical feedback is reduced by the inclination of the edge 21b relative to the normal 15 to the reference plane 14. The reduction of optical feedback by the mirror 21 in the present embodiment will be described below in comparison with the mirror 20 shown in FIG. 1, with reference to FIGS. 5 and 7.

Figure 7:
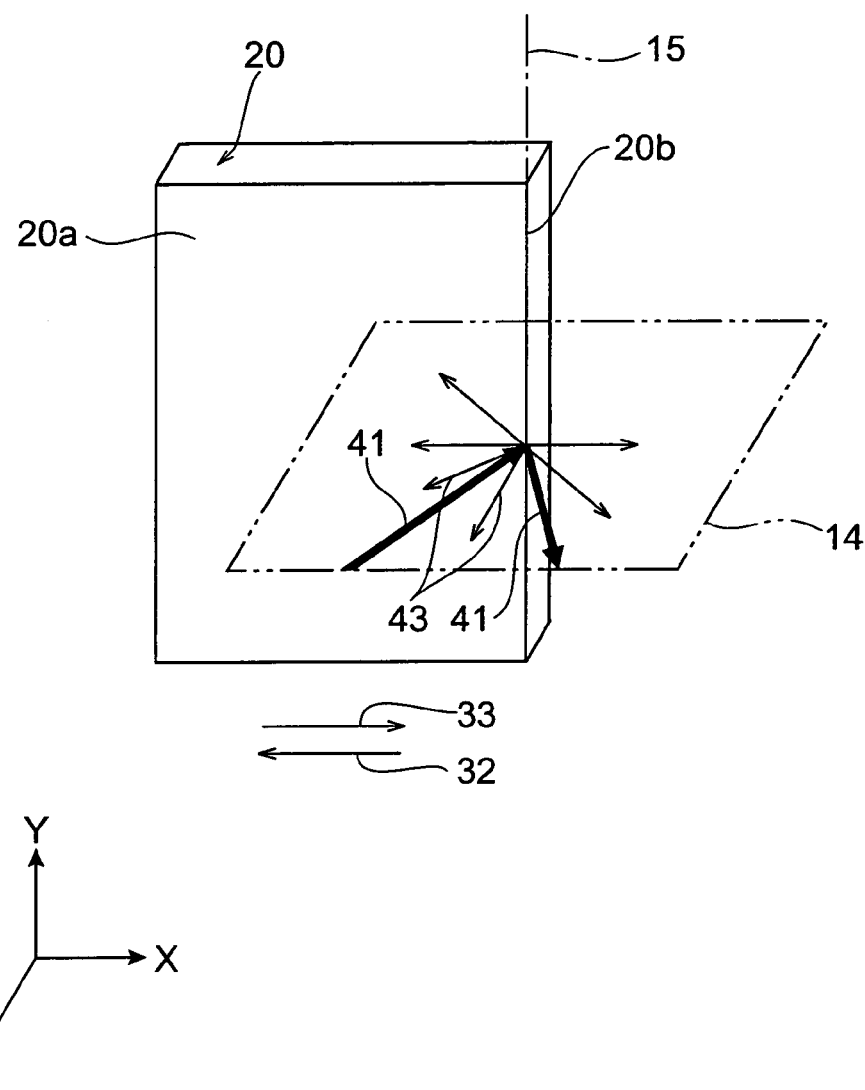
FIG. 7 is a schematic perspective view showing an enlarged view of the mirror shown in FIG. 1.

FIG. 7 is a schematic perspective view showing the mirror 20 shown in FIG. 1. The reflecting surface 20a of the mirror 20 has an edge 20b. The edge 20b is a linear portion parallel to the normal 15 to the reference plane 14. Namely, the edge 20b is normal to the reference plane 14. Theoretically, when light is incident to the edge 20b along the optical axis 16 on the reference plane 14 substantially perpendicular to the edge 20b, optical scattering occurs in the plane 14 and the scattered light 43 travels along the plane 14. The reason why no scattered light appears outside the plane 14 is that light components reflected by the portion of the reflecting surface 20a located on the upper side of the reference plane 14 and light components reflected by the portion of the reflecting surface 20a located on the lower side of the reference plane 14 cancel each other according to the Huygens' principle. When optical scattering occurs in the plane 14 normal to the edge 20b, part of scattered light 43 is relatively easily coupled with the optical waveguide 11 having the optical axis 16 on the same plane 14. The optical feedback to the optical waveguide 11 is induced in this manner.

On the other hand, the mirror 21 of the present embodiment has the edge 21b inclined relative to the normal 15 to the reference plane 14, as shown in FIG. 5. Therefore, the reference plane 14 is not perpendicular to the edge 21b. For this reason, even if light is incident to the edge 21b along the optical axis 16 on the reference plane 14, optical scattering occurs within a plane not parallel to the reference plane 14. This results in decreasing the coupling efficiency of the scattered light to the optical waveguide 11 and thus decreasing the optical feedback to the optical waveguide 11.

Figure 8:
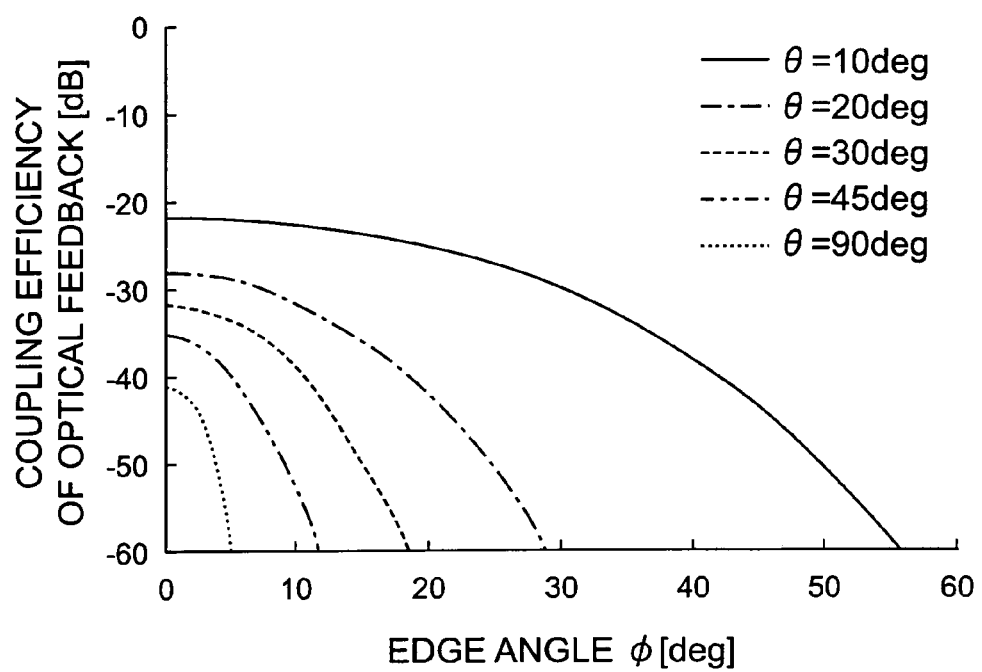
FIG. 8 is a graph showing coupling efficiencies of optical feedback according to edge angles.

The effect of the present embodiment will be confirmed below with reference to FIG. 8. FIG. 8 shows the relationship between the inclination angle φ of the edge 21b and the coupling efficiency of the optical feedback to the optical waveguide 11, for various values of the intersecting angle θ between the optical axes 16 and 17. It is assumed herein that the incident light 41 is a beam having the wavelength of 1.55 µm in vacuum and having a Gaussian distribution with the center on the optical axis 16. The lateral MFD (mode field diameter) of incident light 41 is 20 µm and the vertical MFD 10 µm. The lateral direction and the vertical direction herein are defined as the major-axis direction and the minor-axis direction of elliptical section 44 of the incident light beam shown in FIG. 6, and these are equivalent to the X-direction and the Y-direction, respectively. It is also assumed that the clearance between the end faces of the optical waveguides 11 and 12 and the reflecting surface 21a is filled with a refractive-index matching material having the refractive index of 1.45.

As shown in FIG. 8, the coupling efficiency of the optical feedback decreases as the inclination angle φ of the edge 21b increase, under all the values of θ. The larger the angle θ, the greater the effect of decreasing the coupling efficiency. Particularly, when θ is 45° or more, the coupling efficiency of the optical feedback can be greatly suppressed to −40 dB or less under the inclination angle φ of 5° or more.

The angle between the end faces of the optical waveguides 11 and 12 facing the mirror 21 is determined according to the angle θ between the optical axes 16 and 17. In the case where planar waveguides are used as the optical waveguides 11 and 12, as in the present embodiment, the curvature of the optical waveguides 11 and 12 tends to be large if θ is large. In this case, light can leak in the curved portions of the optical waveguides 11 and 12, so as to raise the risk of occurrence of loss. In the case where the leak light needs to be particularly suppressed, an appropriate range of the angle θ is 30° or less, and the inclination angle φ of the edge 21b is preferably 10° or more. In the present embodiment where the reflecting surface 21a moves along the moving path 46 substantially parallel to the reference plane 14, the inclination angle φ is preferably 75° or less. Increase of the angle φ will also result in increase of the moving distance of the reflecting surface 21a necessary for changing the power of light propagating from the optical waveguide 11 to the optical waveguide 12 by a predetermined amount. Therefore, a too large angle φ will make it difficult to downsize the variable optical attenuator 100.

In order to efficiently reflect the light 41 by the reflecting surface 21a, the length of the edge 21b is preferably larger than the MFD of the incident light 41 in the direction along the edge 21b.

Second Embodiment

Figure 9:
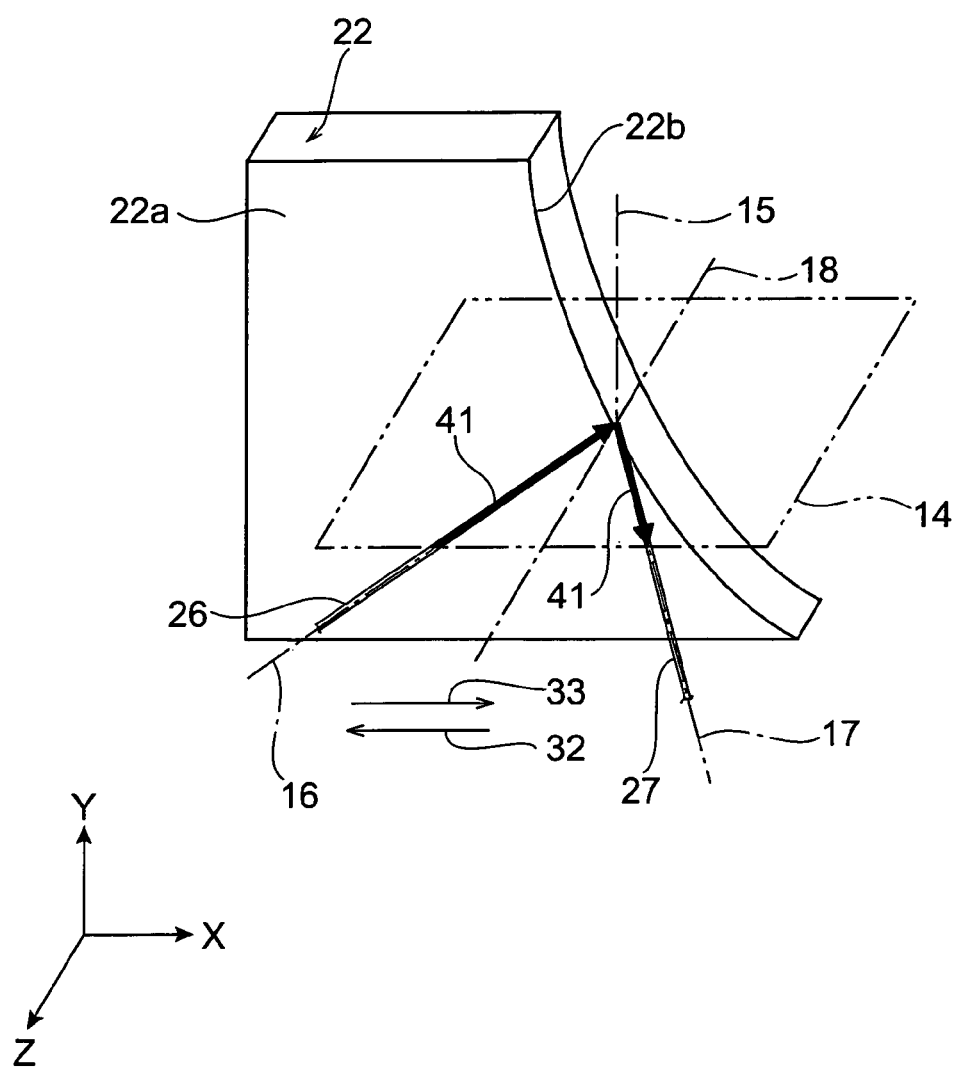
FIG. 9 is a schematic perspective view showing a mirror in a second embodiment.

The second embodiment of the present invention will be described below with reference to FIGS. 4 and 9. FIG. 9 is a schematic perspective view showing a mirror 22 used in the second embodiment. The optical device of the present embodiment is a variable optical attenuator obtained by replacing the mirror 21 in the variable optical attenuator 100 shown in FIG. 4, with the mirror 22 shown in FIG. 9. The variable optical attenuator of the present embodiment has the same configuration as the variable optical attenuator 100 except the mirror.

The mirror 22 is an optical reflector having a reflecting surface 22a. The reflecting surface 22a is substantially flat and has an extremely high reflectance (e.g. 90% or more) for light of a predetermined wavelength propagating in the optical waveguides 11 and 12. The reflecting surface 22a has a substantially uniform reflectance. The mirror 22 moves so as to face the end faces of the optical waveguides 11 and 12. The clearance between the reflecting surface 22a and these end faces may be filled with a refractive-index matching material.

As shown in FIG. 9, the reflecting surface 22a has an edge 22b of a curved shape. The edge 22b moves so as to pass across the bisector 18 with movement of the mirror 22. The reflecting surface 22a and the edge 22b are located substantially on the XY plane. The bisector 18 is parallel to the Z-axis, as described above. Therefore, the edge 22b is located on the plane substantially perpendicular to the bisector 18. It is a matter of course that the edge 22b is not parallel to the normal 15 to the reference plane 14.

In order to efficiently couple the light between the optical waveguides 11 and 12 via the reflecting surface 22a, the reflecting surface 22a and the edge 22b are preferably perfectly perpendicular to the bisector 18. In practice, however, a satisfactorily high coupling efficiency can be achieved if an angle between a projected line of the bisector 18 onto the reflecting surface 22a and the bisector 18 is within the range of 85° to 90°, and more preferably within the range of 89° to 90°.

When receiving from the optical waveguide 11 the light 41 traveling along the optical axis 16 of the optical path 26, the reflecting surface 22a reflects the light 41 along the optical axis 17 of the optical path 27. In consequence, the light 41 from the optical waveguide 11 is incident along the optical axis 17 into the optical waveguide 12 and then propagates in the optical waveguide 12. On the other hand, where the light from the optical waveguide 11 does not impinge on the reflecting surface 22a, the light is not incident to the optical waveguide 12.

When the light incident from the optical waveguide 11 to the reflecting surface 22a is distributed on the edge 22b, the incident light is scattered at the edge 22b by virtue of diffraction. Part of the scattered light is coupled to the optical waveguide 12 and propagates in the optical waveguide 12. After the mirror 22 is moved in the direction of arrow 32 from the position shown in FIG. 9, the incident light comes to be reflected by a narrower region on the reflecting surface 22a, so as to decrease the coupling efficiency from the optical waveguide 11 to the optical waveguide 12. Conversely, after the mirror 22 is moved in the direction of arrow 33 from the position shown in FIG. 9, the incident light comes to be reflected by a wider region on the reflecting surface 22a, so as to increase the coupling efficiency from the optical waveguide 11 to the optical waveguide 12. Therefore, the power of light propagating from the optical waveguide 11 to the optical waveguide 12 can be varied according to the movement of the mirror 22. This is the principle of the operation of the variable optical attenuator of the present embodiment.

As shown in FIG. 9, the edge 22b of curved shape is not perpendicular to the reference plane 14. For this reason, even if light is incident to the edge 21b along the optical axis 16 on the reference plane 14, optical scattering occurs within a plane not parallel to the reference plane 14. This decreases the coupling efficiency of the scattered light to the optical waveguide 11, so as to reduce the optical feedback to the optical waveguide 11.

More generally, the edge of the mirror extending in curved shape within the plane normal to the bisector 18 always includes a portion extending in a direction not perpendicular to the reference plane 14, regardless of the specific shape of the edge. Therefore, at least part of the scattered light is generated within a plane not parallel to the reference plane 14. For this reason, the mirror having the edge of curved shape is more unlikely to couple the scattered light at the edge to the optical waveguide 11 than the mirror 20 having the edge 20b configured of only the straight line normal to the reference plane 14. Therefore, the use of the mirror having the edge of curved portion successfully decreases the coupling efficiency of optical feedback.

Third Embodiment

Figure 10:
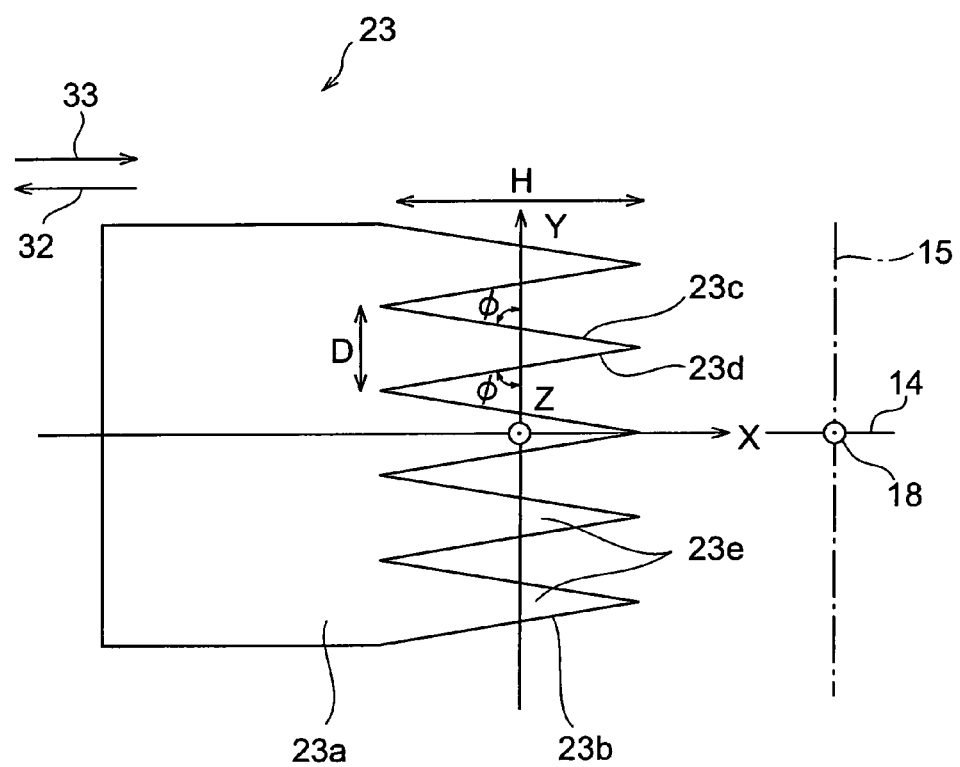
FIG. 10 is a schematic plan view showing a mirror in a third embodiment.

The third embodiment of the present invention will be described below with reference to FIGS. 4 and 10. FIG. 10 is a schematic plan view showing a mirror 23 used in the third embodiment. The optical device of the present embodiment is a variable optical attenuator obtained by replacing the mirror 21 in the variable optical attenuator 100 shown in FIG. 4, with the mirror 23 shown in FIG. 10. The variable optical attenuator of the present embodiment has the same configuration as the variable optical attenuator 100 except the mirror.

The mirror 23 is an optical reflector having a reflecting surface 23a. The reflecting surface 23a is substantially flat and has an extremely high reflectance (e.g. 90% or more) for light of a predetermined wavelength propagating in the optical waveguides 11 and 12. The reflecting surface 23a has a substantially uniform reflectance. The mirror 23 moves so that the reflecting surface 23a faces the end faces of the optical waveguides 11 and 12. The clearance between the reflecting surface 23a and these end faces may be filled with a refractive-index matching material.

As shown in FIG. 10, the reflecting surface 23a has an edge 23b of a sawtooth shape. The edge 23b has a configuration in which linear portions 23c and 23d are alternately connected. In FIG. 10 the linear portions 23c extend right downwardly and the linear portions 23d right upwardly. A bisector of an angle between two adjacent linear portions 23c and 23d is parallel to the X-axis.

The edge 23b moves so as to pass across the bisector 18 of the angle between the optical axes 16 and 17 with movement of the mirror 23. The reflecting surface 23a and the edge 23b are located substantially on the XY plane. The bisector 18 is parallel to the Z-axis. Therefore, the edge 23b is located on the plane substantially perpendicular to the bisector 18. The normal 15 to the reference plane 14 is parallel to the Y-axis. The linear portions 23c and 23d forming the edge 23b all are inclined relative to the normal 15 to the reference plane 14. These linear portions 23c and 23d make an acute angle $\phi$ with the normal 15.

In order to efficiently couple light between the optical waveguides 11 and 12 via the reflecting surface 23a, the reflecting surface 23a and the edge 23b are preferably perfectly perpendicular to the bisector 18. In practice, however, a satisfactorily high coupling efficiency can be achieved if an angle between a projected line of the bisector 18 on the reflecting surface 23a and the bisector 18 is within the range of 85° to 90° and more preferably within the range of 89° to 90°.

In FIG. 10 each of sawteeth of the reflecting surface 23a is represented by reference number 23e. Each sawtooth 23e has a height H along the X-direction. These sawteeth 23e are arranged at intervals D along the Y-direction.

When receiving from the optical waveguide 11 the light 41 traveling along the optical axis 16 of the optical path 26, the reflecting surface 23a reflects the light 41 along the optical axis 17 of the optical path 27. In consequence, the light 41 from the optical waveguide 11 is incident along the optical axis 17 of the optical waveguide 12 into the optical waveguide 12 and then propagates in the optical waveguide 12. On the other hand, where the light 41 from the optical waveguide 11 does not impinge on the reflecting surface 23a, the light 41 is not incident to the optical waveguide 12.

When the light incident from the optical waveguide 11 to the reflecting surface 23a is distributed on the edge 23b, the incident light is scattered at the edge 23b by virtue of diffraction. Part of the scattered light is coupled to the optical waveguide 12 and propagates in the optical waveguide 12. It is assumed herein that the beam of incident light impinges in the region around the origin of the XYZ coordinate system shown in FIG. 10. After the mirror 23 is moved in the direction of arrow 32 from the position shown in FIG. 10, the incident light comes to be reflected by a narrower region on the reflecting surface 23a, so as to decrease the coupling efficiency from the optical waveguide 11 to the optical waveguide 12. Conversely, after the mirror 23 is moved in the direction of arrow 33 from the position shown in FIG. 10, the incident light comes to be reflected by a wider region on the reflecting surface 23a, so as to increase the coupling efficiency from the optical waveguide 11 to the optical waveguide 12. Therefore, the power of light propagating from the optical waveguide 11 to the optical waveguide 12 can be varied according to the movement of the mirror 23. This is the principle of the operation of the variable optical attenuator of the present embodiment.

Just as in the first embodiment, since the edge 23b is configured of the linear portions 23c and 23d inclined relative to the normal 15 to the ZX plane, i.e., reference plane 14, the optical feedback to the optical waveguide 11 can be reduced. However, the scattered light beams at the plurality of linear portions 23c and 23d interfere with each other, and thus the condition for achieving the adequate reduction of optical feedback is different from that in the first embodiment.

In view of this, the reduction of optical feedback in the present invention will be described below from another aspect. The description herein will be given using the function Rav(X) defined by the following equation:

$$Rav(X) = \int R(X,Y) \cdot \Phi(Y) dY / \int \Phi(Y) dY \qquad (1).$$

As shown in FIG. 5, X represents a coordinate in the X-axis direction extending along the intersecting line between the reference plane 14 and the reflecting surface of the mirror, and Y a coordinate in the direction perpendicular to the X-axis in the plane parallel to the reflecting surface of the mirror. R(X,Y) is a reflectance distribution in the XY plane. It is assumed herein that the reflectance is 100% at X and Y coordinates where the reflecting surface 23a is present and that the reflectance is 0% at X and Y coordinates where the reflecting surface 23a is absent. $\Phi(Y)$ indicates a Y-directional intensity distribution of the light incident from the optical waveguide 11 to the reflecting surface 23a.

Figure 11:
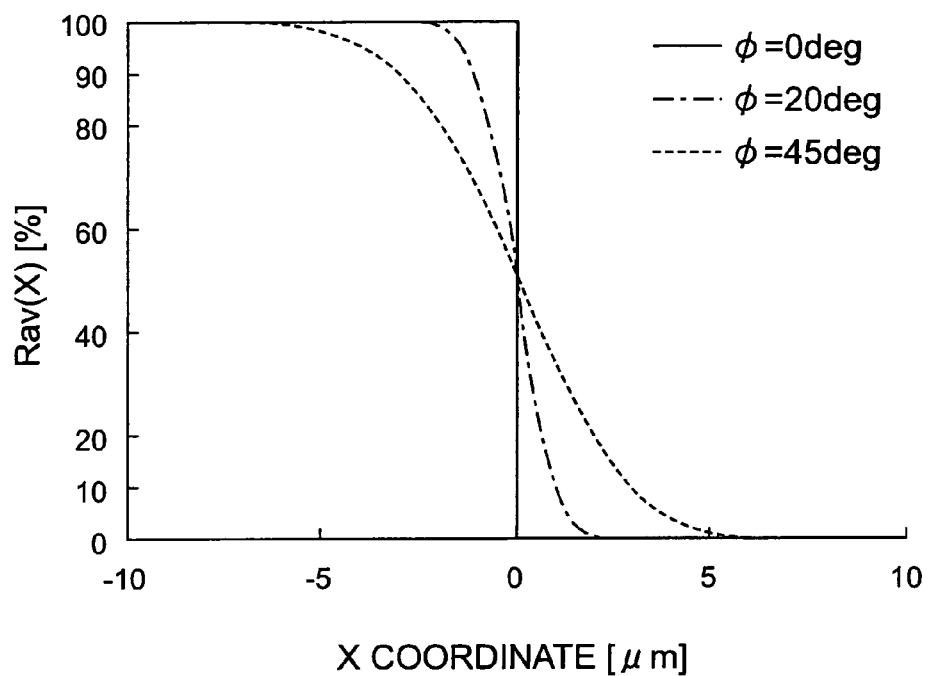
FIG. 11 is a chart showing function Rav(X).

The function Rav(X) indicates a reflectance distribution in the reflecting surface averaged by the Y-directional distribution of the incident light beam. In this interpretation of the suppression of optical feedback using Rav(X), the optical feedback is determined according to the distribution of Rav(X), regardless of the shape of the edge of the mirror. Therefore, the description will be first given using the mirror 21 of FIG. 5. FIG. 11 shows Rav(X) for the mirror 21 (see FIG. 5) on the assumption that $\Phi(Y)$ is a Gaussian distribution with the MFD (mode field diameter) of 10 μm and the inclination angle $\phi$ of the linear portion 21b is 0°, 20° or 45°. In FIG. 11 the origin of X-coordinates is taken at the position where Rav(X) is 50%.

As shown in FIG. 11, in the case of $\phi=0°$, Rav(X)=0% in the region of X>0, and Rav(X)=100% in the region of X<0.

Namely, Rav(X) is discontinuous at the origin of X-coordinates. With φ=0°, the edge 21b is no longer inclined relative to the normal 15 to the reference plane 14, and is a straight line parallel to the normal 15, as in the case of the edge 20b shown in FIG. 7. On the other hand, in the cases of φ=20° and 45°, Rav(X) is continuous at the origin of X-coordinates and smoothly varies near the origin.

As shown in FIG. 11, the variation of Rav(X) near the origin of X-coordinates becomes slower with increase of the inclination angle φ. Therefore, considering that the optical feedback is less with the edge 21b which corresponds to φ>0° than with the edge 20b which corresponds to φ=0°, a condition necessary for reducing the optical feedback is considered to be that the function Rav(X) slowly varies. In the case of φ=0°, Rav varies from 0% to 100% at the single X-coordinate of X=0. According to this fact, the Inventors considers that the optical feedback to the optical waveguide 11 could be adequately reduced in comparison with the mirror 20 having the edge 20b if Rav(X) varies at least from 10% to 90%, more preferably from 0% to 100%, between two different X-coordinates.

Since it is sufficient that the variation of Rav(X) is slower than in the case of φ=0°, Rav(X) does not always have to continuously vary. For example, even in a case where Rav(X) varies stepwise from 10% to 90% between two X-coordinates, the reducing effect of optical feedback can be adequately achieved. However, the steps are more preferably as small as possible because the reducing effect of optical feedback becomes greater.

An X-directional width where Rav(X) varies from 10% to 90% will be referred to hereinafter as an edge width. By replacing the above-described horizontal axis in FIG. 8 with a ratio of edge width/X-directional MFD of incident light beam, FIG. 8 can be redrawn into FIG. 12. It is assumed herein that the incident light beam has a Gaussian distribution and its X-directional MFD is 20 μm and Y-directional MFD 10 μm.

According to the interpretation of reduction of optical feedback using Rav(X), the optical feedback is determined according to the distribution of Rav(X), regardless of the shape of the edge of the mirror. Therefore, while FIG. 8 was acquired about the edge 21b of the shape shown in FIG. 5, FIG. 12 redrawn from it is also applicable to edges of other shapes.

Figure 12:
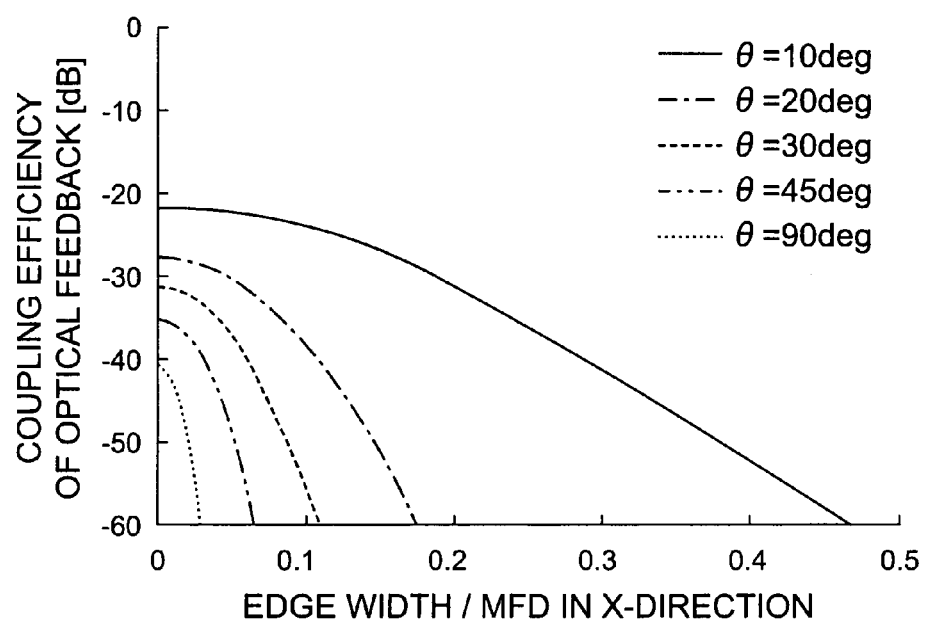
FIG. 12 is a graph showing coupling efficiencies of optical feedback according to (edge width/MFD in X-directional).

As shown in FIG. 12, in the case where the angle θ between the optical axes 16 and 17 is 45° or more, the coupling efficiency of optical feedback can be greatly reduced to −40 dB or less in the range when the value on the horizontal axis in FIG. 12, i.e., (edge width/X-directional MFD) is 0.03 or more. In the edge 23b of sawtooth shape shown in FIG. 10, the edge width is approximately equal to the height H of the sawteeth 23e. Therefore, the optical feedback can be largely reduced if the height H of sawteeth 23e is not less than 3% of the X-directional MFD.

In the case where the optical waveguides 11 and 12 are planar waveguides, as in the present embodiment, the curvature of the optical waveguides 11 and 12 tends to be large if θ is large. In the case where the leak light from the optical waveguides needs to be particularly reduced, an appropriate range of the angle θ is 30° or less and the inclination angle φ of the edge 21b is preferably 10° or more. In this case, the edge width is preferably 6% or more of the X-directional MFD.

Figure 13:
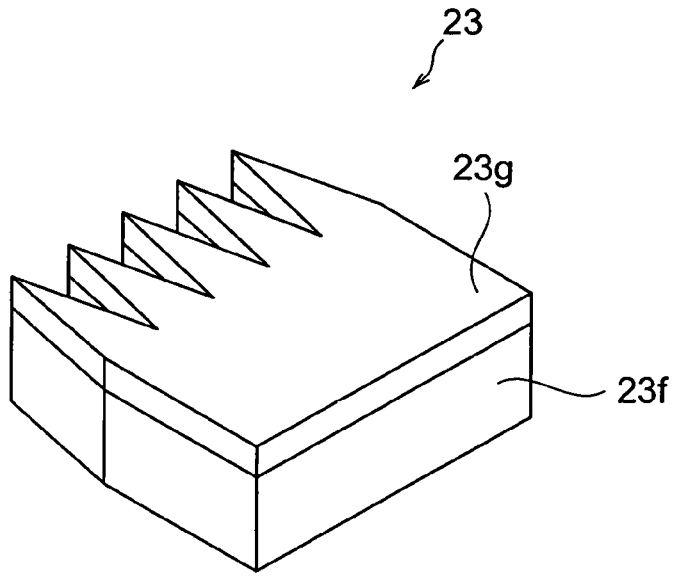
FIG. 13 is a schematic perspective view showing examples of the mirror in the third embodiment.
Figure 13:
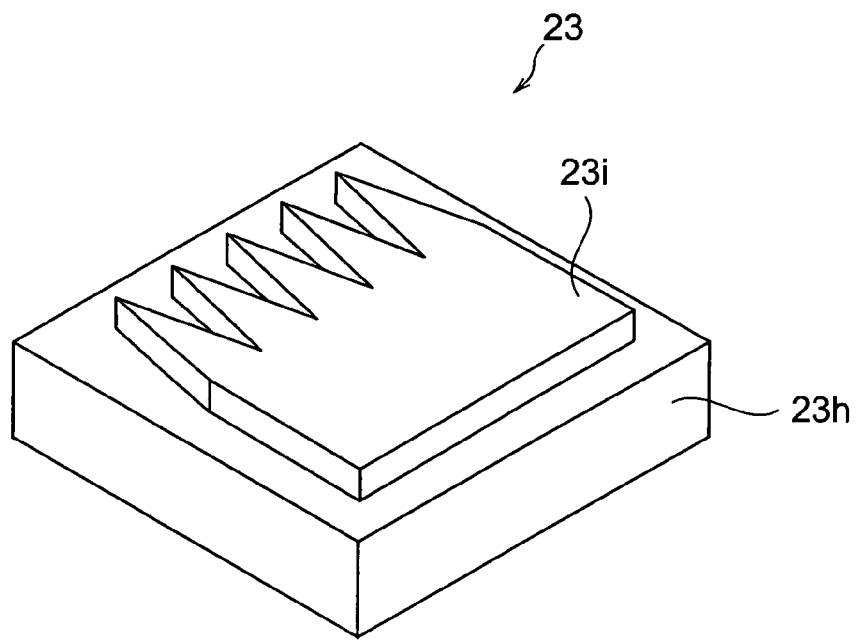

A method of producing the mirror of the above embodiment will be described below with reference to FIG. 13. FIG. 13 is a schematic perspective view showing examples of the mirror 23.

As shown in FIG. 13(a), the mirror 23 can be produced by processing one end portion of a substrate 23f into sawtooth shape and thereafter coating the upper surface of the substrate 23f with a material 23g having a high reflectance. The other mirrors 21 and 22 can also be produced in similar fashion by processing an edge portion of a substrate into a desired shape and thereafter coating the upper surface of the substrate with a high-reflectance material.

The mirror 23 can also be produced by coating an upper surface of a substrate 23h with a high-reflectance material 23i so that it has an edge portion of sawtooth shape, as shown in FIG. 13(b). The other mirrors 21 and 22 can also be produced in similar fashion by coating an upper surface of a substrate with a high-reflectance material so that it has a desired shape. In this process, a portion without the coating of the high-reflectance material exists on the upper surface of the substrate. In order to reduce reflection in this portion, it is preferable to coat the upper surface of the substrate with the high-reflectance material after coating it with an antireflection coating, or to move the mirror in a refractive-index matching material having the refractive index approximately equal to that of the substrate.

The present invention was described above in detail on the basis of the embodiments thereof. It is, however, noted that the present invention is not limited to the above embodiments. The present invention can be modified in various ways without departing from the spirit and scope of the invention.

The above embodiments show the variable optical attenuators as examples of the optical device in accordance with the present invention. However, the present invention may be applied to any other optical device for changing the power of light propagating from one optical path to another optical path. For example, the variable optical attenuators of the above embodiments can reduce the power of the light propagating from the optical waveguide 11 to the optical waveguide 12 to almost zero by moving the mirror. Therefore, these variable optical attenuators can be used as 1×1 optical switches for switching on and off the light propagating from the optical waveguide 11 to the optical waveguide 12.

The optical devices of the above embodiments have the optical waveguides as optical paths. However, the optical devices of the present invention may also comprise optical paths formed in media (e.g., air) by arbitrary optics such as lenses, instead of the optical waveguides. The optical waveguides used as the optical paths are not limited to the planar waveguides in the above embodiments, but may be any other optical waveguides, e.g., optical fibers.

In the above embodiments, the reflecting surface of the mirror is flat. However, the present invention may also adopt the reflecting surface including a curved portion.

In the above embodiments, the mirror linearly moves in the directions perpendicular to the bisector 18. However, the movement of the mirror does not have to be linear. For example, it is also possible to adopt a configuration in which a mirror is fixed to one end of a straight rod-like arm and the mirror is moved by rotating the arm around the other end of the arm. In this case, the moving path of the mirror is a curve of approximately arcuate shape. If the radius of curvature of the moving path is sufficiently large, the moving path becomes approximately linear.

In the optical devices of the present invention, the thickness in the direction perpendicular to the reflecting surface of the mirror is arbitrary. For example, the mirror may have a uniform thickness in the direction perpendicular to the reflecting surface.

In the optical devices of the present invention, the mirror or the mirror driver device may be produced by use of the Micro-Electro-Mechanical System (MEMS) technology. Examples of the mirror driver device include an electrostatic actuator, an electromagnetic actuator using the electromagnetic force, and an actuator using thermal deformation. For example, an electrostatic actuator has a movable electrode part and a stationary electrode part and a mirror is set on the movable electrode part. The movable electrode part is moved by an electrostatic force generated between the electrodes to move the mirror correspondingly.

In the third embodiment the plurality of sawteeth have the same height and width. However, the reflecting surface of the mirror may have a plurality of sawteeth different in height or width, or in both.

In the above embodiments, desired Rav(X) is obtained by the appropriate shape of the edge of the reflecting surface with uniform reflectance. However, instead thereof, desired Rav(X) may also be achieved by the distribution of the reflectance of the reflecting surface. For example, the distribution of the reflectance may be implemented by changing the thicknesses of the high-reflectance material, with which the reflecting surface is coated, depending on positions.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical device comprising:
   a first optical path having a first optical axis;
   a second optical path having a second optical axis not parallel to the first optical axis; and
   a mirror adapted to move across a bisector of an angle between the first optical axis and the second optical axis,
   the mirror having a surface including a reflecting portion for, when receiving light from the first optical path, reflecting the light toward the second optical path,
   the reflecting portion bounded by upper and lower edges and a linear edge located in a plane substantially perpendicular to the bisector, the linear edge extending entirely from the upper edge to the lower edge, and
   wherein the linear edge is inclined relative to a normal to a plane including the first and second optical axes.

2. The optical device according to claim 1, wherein an acute angle between the linear edge and the normal is not less than 5°.

3. The optical device according to claim 1, further comprising at least either an optical waveguide optically coupled to the first optical path or an optical waveguide optically coupled to the second optical path.

4. An optical device comprising:
   a first optical path having a first optical axis;
   a second optical path having a second optical axis not parallel to the first optical axis; and
   a mirror adapted to move across a bisector of an angle between the first optical axis and the second optical axis,
   the mirror having a surface including a substantially flat reflecting portion for, when receiving light from the first optical path, reflecting the light toward the second optical path, and
   the reflecting portion bounded by upper and lower edges and a curved edge located in a plane substantially perpendicular to the bisector, the curved edge extending entirely from the upper edge to the lower edge, and
   wherein the curved edge is configured entirely to exclude parallel linearity relative to a normal to a plane including the first and second optical axes.

5. The optical device according to claim 4, further comprising at least either an optical waveguide optically coupled to the first optical path or an optical waveguide optically coupled to the second optical path.

6. An optical device comprising:
   a first optical path having a first optical axis;
   a second optical path having a second optical axis not parallel to the first optical axis; and
   a mirror adapted to move across a bisector of an angle between the first optical axis and the second optical axis,
   the mirror having a surface including a substantially flat reflecting portion for, when receiving light from the first optical path, reflecting the light toward the second optical path,
   the reflecting portion bounded by upper and lower edges and a linear edge located in a plane substantially perpendicular to the bisector, the linear edge extending entirely from the upper edge to the lower edge,
   wherein the linear edge is inclined relative to a normal to a plane including the first and second optical axes; and
   in the portion placed on the plane substantially perpendicular to the bisector, the value of function Rav(X) defined by the following equation varies at least from 10% to 90% between two different X-coordinates:

$$Rav(X) = \int R(X,Y) \cdot \Phi(Y) dY / \int \Phi(Y) dY,$$

where X represents a coordinate in an X-axis direction extending along an intersecting line between the plane including the first and second optical axes and the reflecting portion, Y a coordinate in a Y-axis direction extending perpendicularly to the X-axis on the reflecting portion, $R(X,Y)$ a reflectance distribution on the XY plane, and $\Phi(Y)$ a Y-directional intensity distribution of light incident from the first optical path to the reflecting portion.

7. The optical device according to claim 6, wherein the distance between two X-coordinates where the value of function Rav(X) varies from 10% to 90% is not less than 3% of an X-directional mode field diameter of the light incident from the first optical path to the reflecting portion.

8. The optical device according to claim 6, further comprising at least either an optical waveguide optically coupled to the first optical path or an optical waveguide optically coupled to the second optical path.

9. A movable reflector comprising:
   a reflecting surface for redirecting an impinging optical light path; and
   a driver device capable of moving the reflecting surface along a predetermined moving path,
   the moving path extending in parallel with a plane substantially perpendicularly traversing the reflecting surface,
   the reflecting surface bounded by upper and lower edges and a linear edge located at the reflecting surface, the linear edge extending entirely from the upper edge to the lower edge and adapted to move while intersecting the plane as the reflecting surface moves along the moving path, and
   the linear edge is inclined relative to a normal to the plane.

10. The movable reflector according to claim 9, wherein an acute angle between the linear portion and the normal is not less than 5°.

11. A movable reflector comprising:
    a reflecting surface for redirecting an impinging light path; and a driver device capable of moving the reflecting surface along a predetermined moving path, the moving path extending in parallel with a plane substantially perpendicularly traversing the reflecting surface, the reflecting surface bounded by upper and lower edges and a curved edge located at the reflecting surface, the curved edge extending entirely from the upper edge to the lower edge and adapted to move while intersecting the plane as the reflecting surface moves along the moving path.

12. An optical device comprising:

a first optical transmission path coupled to a light source and having a first optical axis;

a second optical transmission path coupled to a light receiver and having a second optical axis not parallel to the first optical axis; and a mirror adapted to move across a bisector of an angle between the first optical axis and the second optical axis, the mirror having a surface including a reflecting portion for, when receiving light from the first optical path, reflecting the light toward the second optical path, the reflecting portion bounded by upper and lower edges and a linear edge located in a plane substantially perpendicular to the bisector, the linear edge extending entirely from the upper edge to the lower edge, and wherein the linear edge is inclined relative to a normal to a plane including the first and second optical axes.

13. An optical device as recited in claim 12, wherein the light source comprises a first waveguide and the light receiver comprises a second waveguide.

* * * * *